Dec. 5, 1939. A. E. VICKERY 2,182,141
PLATEN AND/OR FEED ROLLER FOR TYPEWRITING AND LIKE MACHINES
Filed Feb. 8, 1937
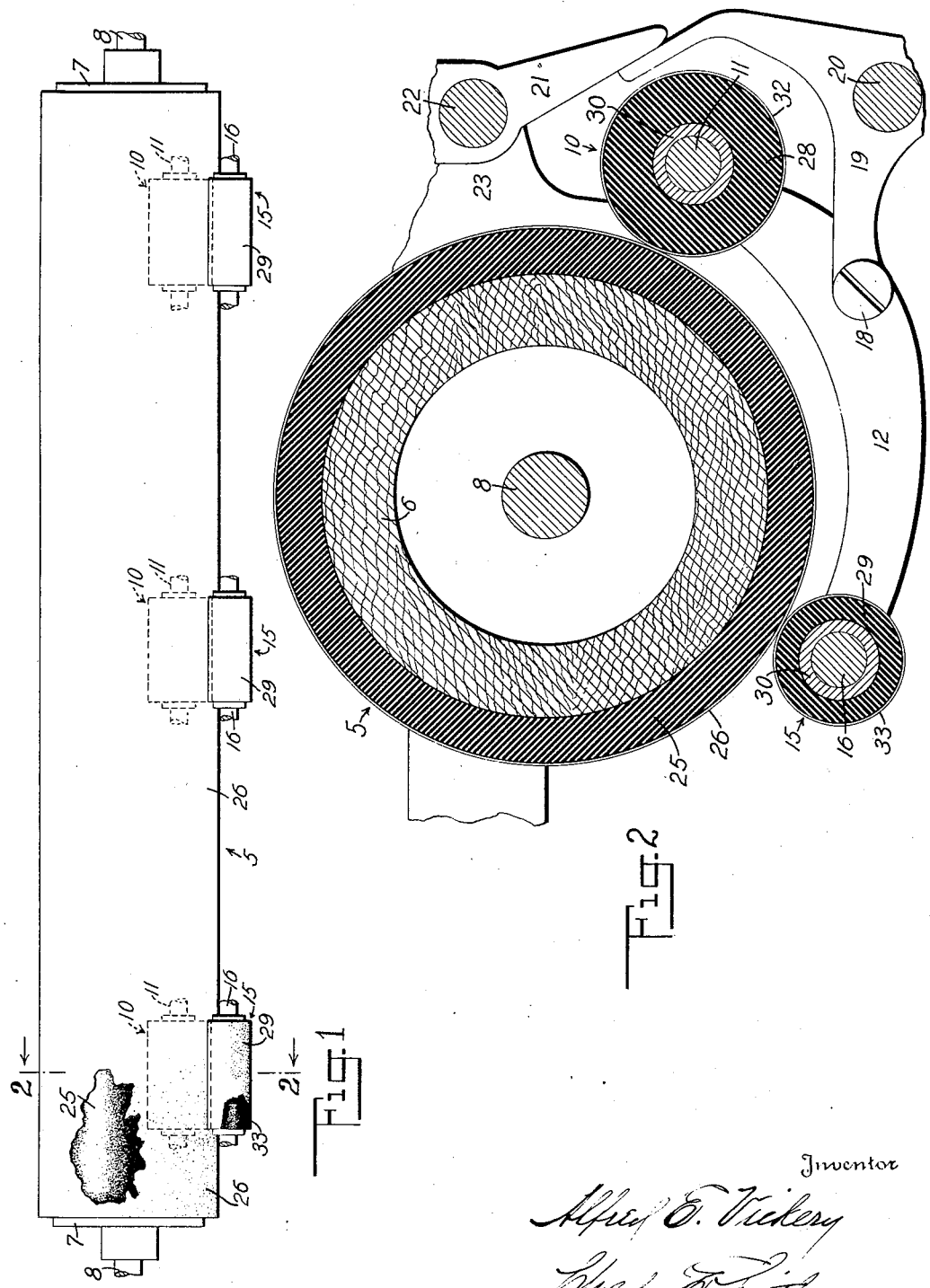

Patented Dec. 5, 1939

2,182,141

UNITED STATES PATENT OFFICE 2,182,141

PLATEN AND/OR FEED ROLLER FOR TYPEWRITING AND LIKE MACHINES

Alfred E. Vickery, Bridgeport, Conn., assignor to Remington Rand, Inc., Buffalo, N. Y., a corporation of Delaware Application February 8, 1937, Serial No. 124,619

4 Claims. (Cl. 197—144)

My invention relates to platens and/or feed rollers for typewriting and like machines.

The main object of my invention, generally stated, is to provide an improved platen and/or feed rollers which is highly effective and capable of retaining its life and useful properties for a longer period than the ordinary rubber composition covered platens or feed rollers now in use.

A further object of my invention is to provide an improved platen possessed of the required characteristics of withstanding for an indefinite period the incessant impacts of types thereon, and having a surface providing an effective and lasting paper feeding quality.

A still further object of my invention is to provide an improved platen or feed roller of the character specified which is impervious to and is unaffected by the various rubber solvents or substances to which they are ordinarily subjected and which soften, disintegrate or otherwise deleteriously affect the ordinary rubber composition covered platens and feed rollers now in use.

To the above and other ends which will hereinafter appear, my invention consists in a platen, feed roller or the like for typewriting and like machines as set forth in the following description and particularly pointed out in the appended claims.

In the drawing, wherein like reference characters designate corresponding parts in the different views:

Fig. 1 is a front elevational view, with parts broken away, of a platen and feed roller assembly in which my invention has been embodied; and Fig. 2 is an enlarged sectional view taken on line 2—2 of Fig. 1 and looking in the direction of the arrows at said line.

It is highly desirable that the platens and the feed rollers for typewriting and like machines possess certain particular and exact physical properties in order to produce best results when in use. The surface of the platen, for example, must have a certain degree of resiliency in order to produce clearly outlined printing of the characters although this degree of resiliency may vary depending on the character of work to be produced. Moreover, the platen and the feed rollers in every instance must present an effective gripping surface for properly feeding and holding the work sheets.

Platens and feed rollers ordinarily are provided with a covering of a composition including natural rubber, the composition being vulcanized to the requisite extent to produce the proper degree of hardness required in each instance. These platens and feed rollers when initially put into use, possess these desired physical properties for the work required. However, the natural vulcanized rubber composition employed for these platen and feed roller coverings gradually becomes harder by oxidation and the surfaces thereof are injured by the action of certain rubber solvents with which the platens and feed rollers occasionally come in contact, and accordingly such rubber composition coverings retain their original properties for only a comparatively short period of time. The effect of oxidation on the ordinary rubber composition covered platen, for example, is to cause the covering to lose its resiliency and become so hard that the impact of the types thereon causes pitting of the surface, and the surfaces of the platen and feed rollers become smooth and lose their gripping qualities which allows them to slip on the work sheets and improperly feed the latter. Moreover, certain solvents found in ink or any petroleum product, such as oil or cleaning fluid ordinarily employed on typewriting machines, often causes the ordinary rubber covering of platens and feed rollers to become soft or to disintegrate to an extent that renders them unsatisfactory for use after only a comparatively short period of time. It has been found that platens and feed rollers covered with ordinary rubber composition when used in machines employed for cutting stencils, for example, must be renewed after from three to nine months of service due to the injurious effect of the oils and greases in the stencils on the rubber composition coverings.

I have found that there are certain synthetic, rubber-like materials which, in contra-distinction to natural rubber, are impervious to all the solvents and deteriorating substances with which the platens and feed rollers of a typewriting or like machine may ordinarily come in contact, and further I have found that these synthetic rubber-like materials are not appreciably damaged by oxidation and provide a good gripping surface for feeding the work sheets. One synthetic, rubber-like material which I have found to have such qualities and which I have used with excellent results is olefine polysulphide or the material sold under the trade name of "Thiokol". Another similar material is polymerized chloroprene or the material sold under the trade name of "Duprene". I shall later describe these materials more specifically, but for the present I shall merely refer to them by their generally known name of synthetic rubber.

On the other hand, such synthetic rubber does not have certain physical properties necessary for producing best results when used alone for the entire covering for platens and feed rollers. For example, I have found that such synthetic rubber when used alone does not possess the permanent elasticity of natural rubber composition ordinarily employed, and accordingly may acquire a permanent set when deformed by pressure or the like. This lack of permanent elasticity is a particular disadvantage inasmuch as the normal contacting pressure between the feed rollers and the platen causes flat spots to form on the surfaces of a covering entirely of such synthetic rubber at the contacting points when the machine is not in use, which flat spots obviously prevent proper functioning of the platen and feed rollers.

In view of these facts, I provide a platen and feed roller in accordance with the present invention having the usual covering of natural rubber composition, and provide a very thin veneer or coating of synthetic rubber, of the olefine polysulphide type for example, over the outer surface of such usual covering of natural rubber composition. In this manner, I obtain a platen covering having the beneficial qualities of both natural rubber composition and the said synthetic rubber. In other words, the physical properties of the natural rubber composition covering, such as its initial elasticity, is not impaired by the thin coating of synthetic rubber, and yet this thin coating of synthetic rubber, being unaffected by deteriorating substances or atmospheric conditions, protects the natural rubber composition covering and retains indefinitely the original physical properties thereof and prevents oxidation of the rubber.

I shall now describe a specific embodiment of my invention in a platen and feed rollers for typewriting and like machines as disclosed in the accompanying drawing. The term "platen" employed herein is intended to refer to a flat platen as well as the ordinary cylindrical platen.

In the accompanying drawing, I have shown my invention applied to a platen and feed roller assembly of a Remington standard typewriting machine, but it should be understood, however, that the features of the present invention are not limited to their embodiment in the particular type of platen or feed rollers illustrated herein, but may be employed in platens, feed rollers and the like of various kinds, wherever found available.

The platen shown in the accompanying drawing is designated as a whole by the reference numeral 5 and in the present instance comprises a hollow core member 6, made of wood or any other suitable material, and metal end plates or platen heads 7 suitably secured thereto. The platen heads 7 are fixedly secured to a concentric platen shaft 8 whereby the platen is rotatably mounted in the carriage in the usual manner.

The main feed rollers are each designated by the reference numeral 10 and are rotatably mounted on a shaft 11 carried by rearward ends of the usual cradle members 12, as shown in Fig. 2. The forward feed rollers are each designated by the reference numeral 15 and are rotatably mounted on a shaft 16 carried by the forward ends of the cradle members 12. The cradle members 12 are pivotally connected at their central portions, at 18, to companion supporting members 19 which are mounted on a rock shaft 20 in the usual manner. The main feed rollers 10 as well as the forward feed rollers 15 are normally maintained in spring pressed relationship with the platen 5 by suitable springs (not shown) coacting with the supporting members 19, and the feed rollers 10 and 15 are manually releasable by the usual mechanism shown in part by the arm 21 carried by a rock shaft 22 supported by the carriage end plates 23.

The platen covering in the present instance comprises a layer 25 of vulcanized natural rubber composition of suitable thickness applied to the hollow core 6. This layer of natural rubber composition 25 may be formed in the usual manner to afford the physical qualities, such as the degree of resiliency which is found desirable to provide the requisite printing and feeding characteristics. In accordance with the present invention, a very thin coating or veneer 26 of a synthetic rubber, of the olefine polysulphide type for example, surrounds the entire outer surface of the layer 25 of natural rubber composition.

The main and forward feed rollers 10 and 15 comprise the usual relatively soft vulcanized natural rubber composition coverings 28 and 29 respectively carried on metal cores 30, the cover 28 being similar to roll 29 in every respect except for its larger diameter. In accordance with the present invention, thin coatings or veneers 32 and 33 of a synthetic rubber, of the olefine polysulphide type for example, surround the entire outer surfaces of the natural rubber covers 28 and 29 respectively.

In making the platen 5 in accordance with the present invention, the covering 25 of natural rubber composition may be applied and vulcanized in the usual manner on the core 6. The platen may then be finished by grinding to provide an even and true surface in the same manner as though the synthetic rubber coating 26 were not to be applied thereto.

The coating 26 is then applied to the natural rubber composition covering 25 by applying synthetic rubber in a liquid state over the entire surface of the covering 25 and vulcanizing the synthetic rubber to the underlying natural rubber composition covering. It is desirable that the coating 26 should be very thin, and accordingly I prefer to spray with the aid of a suitable spraying device a thin coat of the liquid synthetic rubber upon the surface of the covering 25, although it may be applied thereto with a brush, by dipping, or any other suitable method.

A thin coating of the synthetic rubber is likewise sprayed upon the surfaces of the natural rubber composition rolls 28 and 29, after they are finished in the usual manner, to form the coatings 32 and 33 which are then vulcanized to the underlying natural rubber in the same manner as the coating 26 on the platen covering 25. It will be understood that the synthetic rubber coating on the platen and feed rollers is very thin, and the thickness illustrated in the drawing is an exaggeration for the purpose of illustration. I do not find it necessary to grind or refinish the platen and feed rollers after this veneer coating of synthetic rubber has been vulcanized thereto.

The material used for the veneer or coating on the outer surfaces of the platen and feed rollers, which I have herein referred to as synthetic rubber, may be any commercial synthetic colloid possessing the general physical characteristics of natural rubber such as elasticity and resiliency, but which is not deleteriously affected by oxidation or by the solvents ordinarily encountered in a typewriting or like machine. The material which I have referred to as natural rubber in contra-distinction therewith, however, is the common product formed primarily from the latex bearing cells of the *Hevea brasiliensis*, or rubber tree.

As a specific example, I have found that a synthetic rubber material sold under the trade name of "Thiokol" is suitable for forming the outer veneer coating on the platen and feed rollers. It is my understanding that this material sold under the trade name of "Thiokol" is primarily olefine polysulphide and is made by the reaction of polysulphides with ethylene dichloride or dichloroethyl ether compounds. However, other commercial synthetic rubber materials having like properties may also be used, such for example as that sold under the trade name of "Duprene". It is also my understanding that this material sold under the trade name of "Duprene" is made by the polymerization of chloroprene and may be referred to as polymerized chloroprene. Such materials as "Thiokol" and "Duprene" have the property of resisting oxidation and solvents, particularly hydrocarbons, acids and mild alkalies, and this property of resisting oxidation and solvents is greatly enhanced by vulcanizing, this being especially true of the "Thiokol" material. In practice I have used such first named synthetic rubber in a liquid form, such for example as the specific product known as "Thiokol C-202", which may be diluted with a suitable thinner. However, certain other specific forms of the "Thiokol" material which require less time to vulcanize may be used to advantage.

From the foregoing description, it will be understood that I have provided by the present invention a platen, feed roller or the like which will not oxidize or deteriorate appreciably with age and which is unaffected by any of the usual rubber solvents with which it may come in contact, thus retaining for an indefinite period the original utility of such platen and feed rollers. In other words, I have provided a platen and/or feed roller having a natural rubber composition covering possessing the required physical qualities and I have provided means for indefinitely retaining such qualities by coating the natural rubber composition with a thin protective layer of material which due to its thinness and flexibility does not impair the physical qualities of the natural rubber and yet which is able to protect the underlying natural rubber against deleterious foreign substances or rubber solvents and from oxidation.

Although I have shown and described only one specific type of platen and feed rollers embodying my invention, it is nevertheless, to be understood that the features of my invention may be embodied in platens and feed rollers of various other types, and that various changes may be made therein without departing from my invention as it is defined in the accompanying claims.

What I claim as new and desire to secure by Letters Patent is:

1. In a platen for typewriting and like machines, a covering of the usual vulcanized natural rubber composition having a degree of hardness and resiliency to afford proper typing by the force of the types thereagainst, and a protective coating applied over said natural rubber composition covering in a sufficiently thin layer to provide a platen having substantially the said hardness and resiliency of the underlying composition covering, said protective coating comprising a rubber-like material having the properties of resisting oxidation and deterioration by rubber solvents.

2. In a platen for typewriting and like machines, a covering of the usual vulcanized natural rubber composition having a degree of hardness and resiliency to afford proper typing by the force of the types thereagainst, and a protective coating applied over said natural rubber composition covering in a sufficiently thin layer to provide a platen having substantially the said hardness and resiliency of the underlying composition covering, said protective coating comprising olefine polysulphide.

3. In a platen for typewriting and like machines, a covering of the usual vulcanized natural rubber composition having a degree of hardness and resiliency to afford proper typing by the force of the types thereagainst, and a protective coating applied over said natural rubber composition covering in a sufficiently thin layer to provide a platen substantially the said hardness and resiliency of the underlying composition covering, said protective coating comprising polymerized chloroprene.

4. In a platen for typewriting and like machines, a body of vulcanized natural rubber composition having a hardness and resiliency ordinarily affording proper typing by receiving the force of the printing instrumentalities, and a protective coating sprayed or painted on said body in a sufficiently thin layer to provide a platen having substantially the said hardness and resiliency of the underlying natural rubber composition of said body, said protective coating comprising a rubber-like synthetic colloid having the property of resisting oxidation and natural rubber solvents.

ALFRED E. VICKERY.